United States Patent [19]
Wakeman

[11] 3,831,906
[45] Aug. 27, 1974

[54] INGREDIENT DISPERSING APPARATUS
[75] Inventor: Alden H. Wakeman, Lake Mills, Wis.
[73] Assignee: Crepaco, Inc., Lake Mills, Wis.
[22] Filed: Nov. 9, 1972
[21] Appl. No.: 305,154

[52] U.S. Cl............... 259/6, 222/145, 259/104, 418/15
[51] Int. Cl. .............. B01f 7/02, B01f 3/12
[58] Field of Search ............ 259/6, 21, 41, 104; 418/15; 222/129.1, 145

[56] References Cited
UNITED STATES PATENTS

| | | | |
|---|---|---|---|
| 1,833,275 | 11/1931 | Burmeister | 418/15 X |
| 3,132,847 | 5/1964 | Mercuriali | 418/15 X |
| 3,592,445 | 7/1971 | Whitecar | 259/6 |
| 3,628,893 | 12/1971 | Carpigiani | 418/15 X |

Primary Examiner—Robert L. Bleutge
Assistant Examiner—Philip R. Coe
Attorney, Agent, or Firm—Woodling, Krost, Granger & Rust

[57] ABSTRACT

An ingredient dispersing apparatus is disclosed for dispersing a semi-solid ingredient into a viscous fluid ingredient to produce a homogeneous dispersion. The invention comprises a mixer such as a gear pump to divide the semi-solid ingredient into discrete volumes and provisions for streaming the viscous fluid to remove the semi-solid ingredient from the mixer. The apparatus is easily cleaned and is desirable for use with food products such as ice cream, yogurt and the like. The foregoing abstract is merely a resume of one general application, is not a complete discussion of all principles of operation or applications and is not to be construed as a limitation on the scope of the claimed subject matter.

12 Claims, 6 Drawing Figures

INGREDIENT DISPERSING APPARATUS

BACKGROUND OF THE INVENTION

This invention relates to agitators and more particularly to devices for dispersing a first ingredient into a second ingredient.

The prior art has known many types of mixing devices to disperse a first ingredient into a second ingredient. A very important and specialized use of these devices includes the mixing of food products. Devices for mixing food products must be constructed of sanitary material and be easy to clean.

Sometimes it is desirable to disperse only a first ingredient into a second ingredient such as mixing flavor elements such as raspberries, strawberries, or nuts, into ice cream or yogurt. The desired end product is a homogeneous dispersion which requires only a limited amount of mixing in contrast to a homogeneous mixture. Manufacturers have realized that a homogeneous dispersion of flavor elements in a food product is necessary to satisfy purchasers. The machines of the prior art to produce a homogeneous dispersion were in general expensive and difficult to clean. The most widely used mixing machine of the prior art was the auger type mixer which was difficult to clean, very slow and very expensive. These mixers tended to destroy the individual character of the flavor elements producing a mixture rather than a dispersion.

Therefore, an object of this invention is to produce an ingredient dispersing apparatus which produces a homogeneous dispersion.

Another object of this invention is to produce an ingredient dispersing apparatus which is easy to clean.

Another object of this invention is to produce an ingredient dispersing apparatus which is inexpensive.

Another object of this invention is to produce an ingredient dispersing apparatus capable of high speed operation.

Another object of this invention is to produce an ingredient dispersing apparatus which does not destroy or damage the individual character of the ingredients.

SUMMARY OF THE INVENTION

The invention may be incorporated in an apparatus to disperse a first ingredient into a second ingredient, comprising in combination, a housing, a mixer means, means for moving said mixer means, means for introducing the first ingredient into said housing, means establishing cooperation between said housing and said mixer means to define volumes of the first ingredient, means for streaming the second ingredient to wash said mixer means of the first ingredient and to disperse said defined volumes of the first ingredient into the stream of the second ingredient, and means for discharging the first and second ingredients from said housing.

Other objects and a fuller understanding of the invention may be held by referring to the following description and claims, taken in conjunction with the accompanying drawing.

DESCRIPTION OF THE PREFERRED EMBODIMENT

Figure 1:
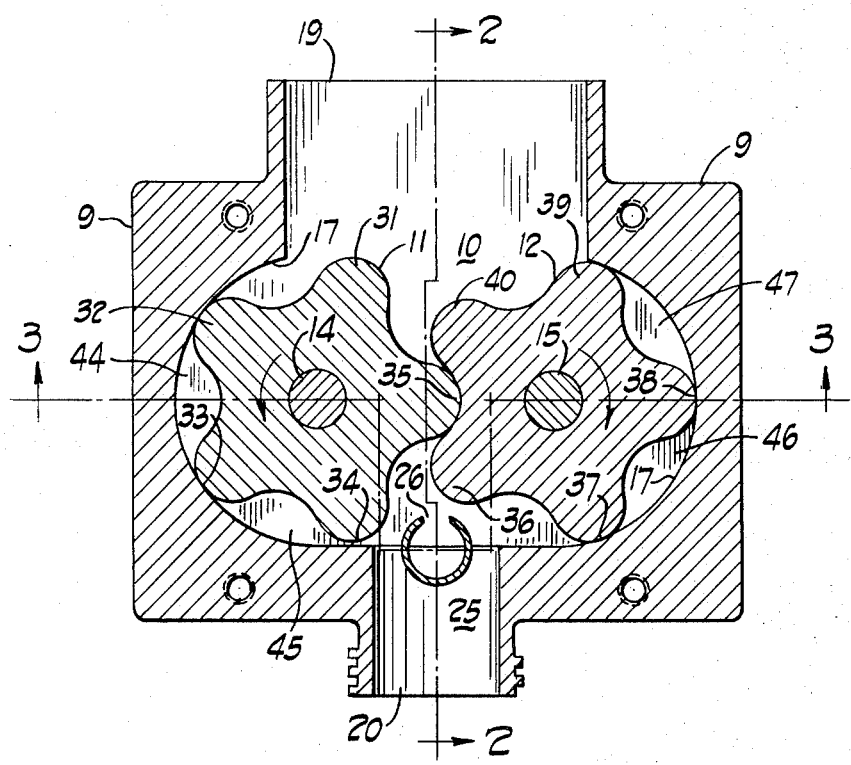
FIG. 1 is a front sectional view of an ingredient dispersing apparatus.

FIG. 1 illustrates an apparatus to disperse a first ingredient into a second ingredient comprising a housing 9 and mixer means shown generally as 10. The housing 9 has a housing surface 17 defining a chamber. The housing 9 has an input aperture 19 and an output aperture 20 located on opposite sides of the chamber. The input aperture 19 operates to introduce the first ingredient into the housing whereas the output aperture 20 discharges the dispersion of the first and second ingredients from the housing 9. The mixer 10 is illustrated as first and second rotor means 11 and 12, each rotatable about a shaft 14 and 15, respectively. The first and second rotor means 11 and 12 are established in cooperation with one another and with the housing 9 to define volumes of the first ingredient. The first and second rotor means 11 and 12 are shown in mesh with one another and having a portion of the circumference of the rotors in close proximity to the housing 9. The first and second rotor means 11 and 12 can be described as first and second gear means; the first gear means 11 having teeth 31—35 and the second gear means 12 having teeth 36—40. The first and second gear means 11 and 12 are established within the chamber by appropriate mounting to define discrete volume elements between adjacent teeth when the adjacent teeth are in close proximity to the housing surface 17. The invention includes means for moving the mixer means 10, shown in FIGS. 2 and 6 as a motor 30, for rotating the first and second rotor means 11 and 12. The apparatus includes means 25 for streaming the second ingredient into the chamber to disperse the first ingredient into the second ingredient to be discharged through the output aperture 20.

The invention can best be understood by considering the typical operation of the apparatus. A first ingredient such as a semi-solid food product as nuts, cherries or crushed pineapple in a syrup is introduced into the input aperture 19. Motor means 30, preferably hydraulic motor means, is connected to rotate the first and second rotor means 11 and 12 as indicated by the arrows. The first and second rotor means 11 and 12 define discrete volumes or volume elements between adjacent teeth of the rotor means and the housing surface 17 of the housing 9. For example, the teeth 31 and 32 have not yet defined a volume but a volume 44 is defined by the region between the adjacent teeth 32 and 33 and the housing surface 17. Similarly, a volume 45 between teeth 33 and 34 and the housing surface 17 is defined. The second rotor means 12 also defines volumes 46 and 47 by teeth 37, 38 and 38, 39, respectively. The rotation rate of the first and second rotor means 11 and 12 determines the number of discrete volume elements separated by the first and second rotor means in a given period of time. The first and second rotor means 11 and 12 are in mesh with one another to eliminate the flow of the ingredients back to the input aperture 19.

Figure 2:
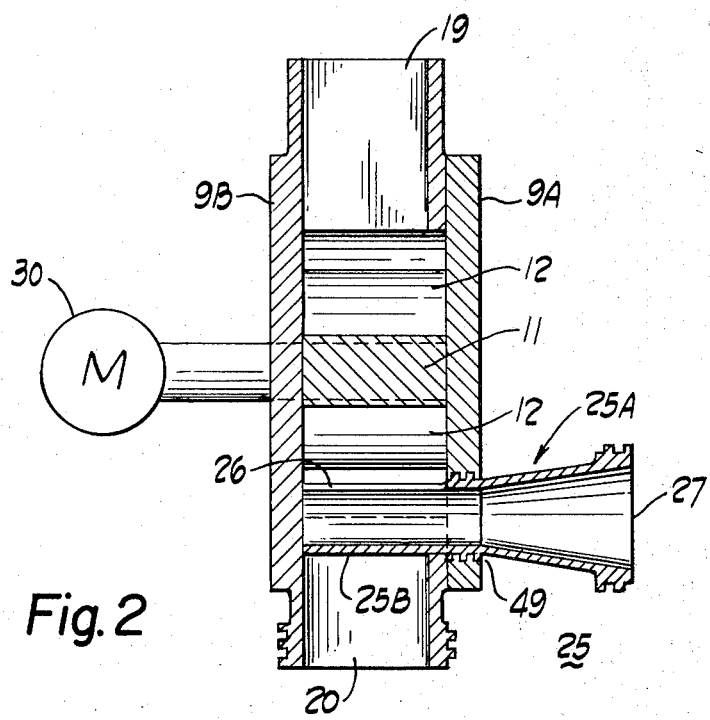
FIG. 2 is a side sectional view of the ingredient dispersing apparatus shown in FIG. 1.

The means for streaming 25 is shown as tubing means extending through the housing 9 having a portion 25A outside of the housing 9 and a portion 25B shown in FIG. 2 within the chamber defined by the housing surface 17. A stream of the second ingredient viscous fluid, such as yogurt or ice cream or other food products, is forced under pressure through the tubing means from an opening 27 to mix with the first ingredient. The tubing means 25 has orifice means 26 shown in FIGS. 2 and 3 as a slot, to direct the viscous fluid second ingredient directly at the mesh of the first and second rotor means 11 and 12 in proximity to the output aperture 20. The stream of the second ingredient from the orifice means 26 washes the first ingredient from adjacent gear teeth and removes the discrete volumes. The discrete volumes are dispersed within the second ingredient to discharge from the output aperture 20. The streaming viscous fluid removes the first ingredient from adjacent teeth, and lubricates the teeth of the first and second rotor means 11 and 12. The control of the amount of streaming of the second ingredient in relationship to the rotation rate of the first and second rotor means 11 and 12 determines the amount of first ingredient which is dispersed into the second ingredient. The apparatus has the advantage of a substantially uniform dispersion of semi-solid first ingredient into a viscous fluid second ingredient without the necessity of long term mixing which had the tendency to destroy the semi-solid character of the first ingredient. In the prior art mixing machines, an effort was made to achieve a substantailly uniform dispersion. However, the first ingredient lost much character as a discrete semi-solid and was substantially mixed into the second ingredient rather than being uniformly dispersed. The prior art mixing machines were also much slower than the disclosed invention.

FIG. 2 illustrates a side sectional view of FIG. 1 along the line 2—2 showing the tubing means 25 in greater detail. The orifice means 26 is shown as a slot being substantially parallel to the axis of rotation of the first and second gear means 11 and 12. The length of the slot 26 is substantially equal to the thickness of the first and second gear means 11 and 12. FIG. 2 also illustrates schematically the motor means 30 to rotate the first and second gear means 11 and 12. The motor means 30 can be either a separate hydraulic motor for each of the first and second gear means 11 and 12, or a single hydraulic motor. Synchronization between the first and second rotor means 11 and 12 can be achieved by either using the teeth of the first and second rotor means 11 and 12 as drive to one another or using a second gearing mechanism. Although a hydraulic motor is highly desirable, the invention can incorporate any type of driving device. A hydraulic motor has the distinct advantage that when the stream of the second ingredient ceases, a build-up of the semi-solid first ingredient will stall the first and second rotor means 11 and 12. It s highly desirable for the first and second rotor means 11 and 12 to stall to prevent jamming at the mesh of the first and second rotor means, and secondly to prevent damage to the distinct semi-solid character of the first ingredient. If the rotor means continue to rotate after the stream of the second ingredient has stopped, then the first ingredient would be pulverized between the mesh of the first and second gear means 11 and 12. The incorporation of hydraulic motor means into this invention allows the first and second gear means 11 and 12 to stall and the hydraulic motor means will absorb the stall without damage to the apparatus.

Figure 3:
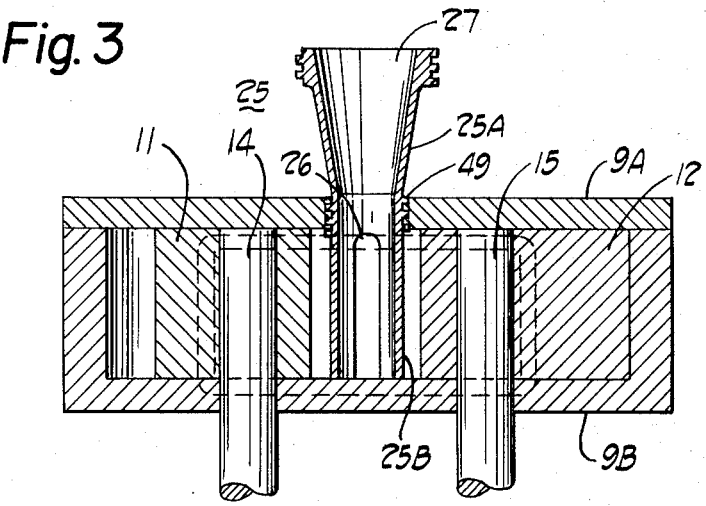
FIG. 3 is a bottom sectional view along the line 3—3 of the FIG. 1.

FIG. 3 illustrates the bottom sectional view along line 3—3 of FIG. 1. The housing 9 includes a front housing 9A and a rear housing 9B. The front housing 9A and the tubing means 25 can be removed from the rear housing 9B to clean the first and second rotor means 11 and 12. The ability to completely disassemble the housing 9 to give access to the first and second rotor means 11 and 12 makes the apparatus highly desirable for use in the food product industry. The entire rotor assembly can be cleaned and inspected for wear of the sanitary surfaces after each use. The orifice 26 is shown as a slot which slot is substantially equal in length to the thickness of the first and second rotor means 11 and 12. The orifice 26 need not be a slot but could be a plurality of holes or any suitable geometric shape determined by the streaming rate and viscosity of the second ingredient. The tubing means portion 25A outside of the housing has an input 27 for connection to a source of the streaming second ingredient. The portion 26B of the tubing means 25 extends through the housing 9 into the chamber of the housing 9. The tubing means 25 is threaded into the housing 9A by threads 49 to facilitate change of the tubing means 25 with another having an orifice means 26 of a different geometric structure.

Figure 4:
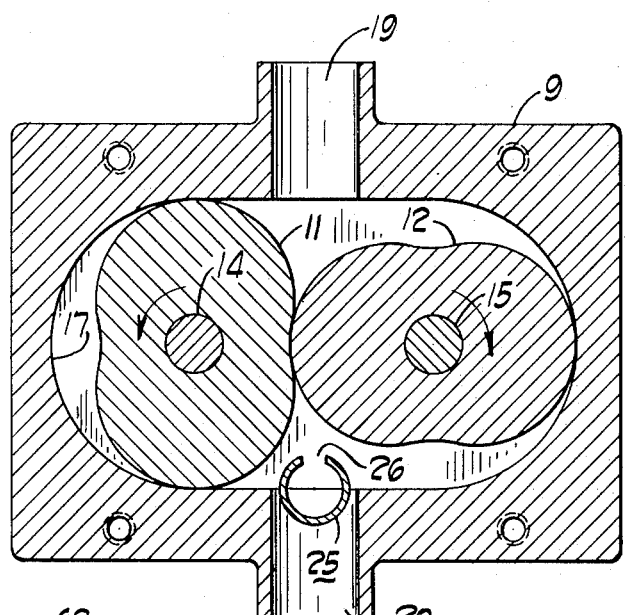
FIG. 4 is a front sectional view of a variation of the apparatus shown in FIG. 1.

FIG. 4 illustrates a variation of the mixer means 10 shown in FIG. 1 wherein each rotor means is shown as an elongated member. Each rotor can be considered gear means having only two teeth. Such a geometry may have a particular advantage for specific ingredients. Many variations of FIGS. 1 and 4 can be incorporated into this invention to divide the first ingredient into discrete volumes such as standard gears, belts, eccentric cams and the like. The invention although illustrated by the apparatus shown in FIGS. 1–6 also resides in the method of dispersing a first ingredient into a second ingredient since the end result can be accomplished by a plurality of distinct and separate structures.

The method of dispersing a first semi-solid ingredient such as flavor elements into a second viscous fluid ingredient such as a food product by mixer means 10 having protrusions or teeth and located in a housing 9 comprises introducing the first ingredient into the housing 9. The first ingredient is then separated into substantially discrete volumes between the protrusions in the mixer means 10 and the housing 9. The method includes the step of moving the first ingredient by the mixer means 10 to periodically introduce discrete volumes of the first ingredient into contact with the second ingredient. The second ingredient is streamed in a continuous flow to wash the mixer means 10 of the discrete volumes of the first ingredient and to disperse the first ingredient uniformly within the second ingredient. The final step of the method is to remove the first and second ingredients from the housing 9.

The method of dispersing a first ingredient into a second ingredient has the distinct advantage that the first ingredient having a semi-solid character is maintained although the end product is a homogeneous dispersion. This overcomes many of the disadvantages of the prior art wherein the semi-solid character of the first ingredient was destroyed by excessive mixing in order to achieve a uniform dispersion.

Figure 5:
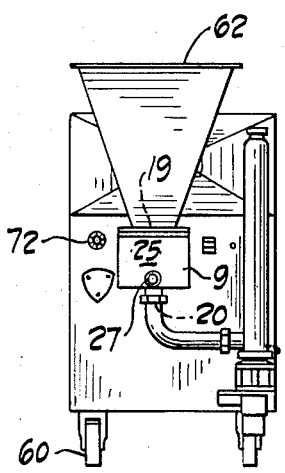
FIG. 5 is a front view of an ingredient dispersing machine incorporating the apparatus of FIG. 1; and, FIG. 6 is a side view of the machine shown in FIG. 5.

FIG. 5 illustrates a front view of an apparatus incorporating the invention. The apparatus is shown mounted on wheels 60 for movement and includes a hopper 62 for storing and introducing the first ingredient into the housing 9. The means for introducing the first ingredient includes the sloped sides of the hopper 62 and gravity feed into the housing 9. However, the means for introducing can be a pump or the like. An example of a typical flow rate of the apparatus shown in FIGS. 5–6 for dispersing a first ingredient of flavor elements into a second ingredient of ice cream is 2,300 liters per hour for the ice cream with the flow rate of the first ingredient being variable from 6–300 liters per hour.

Figure 6:
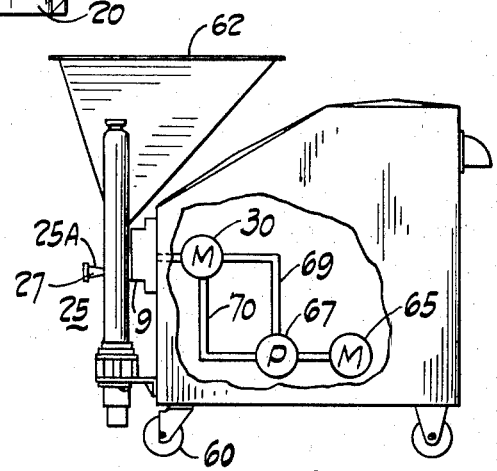

FIG. 6 illustrates a side view of the apparatus in FIG. 5 having a cut-out showing the internal mechanism. The apparatus includes an electric motor 65 operating a hydraulic pump 67 which is connected to a hydraulic motor 30 by way of conduits 69 and 70. The invention includes controls 72 shown in FIG. 5 to control the rotation rate of the first and second rotor means 11 and 12 to vary the rate at which the discrete volumes are introduced to the streaming second ingredient.

The apparatus and method for dispersing a first ingredient into a second ingredient can be extremely useful in the food product industry due to the simple construction, fast operation and ease of cleaning. For these reasons, the apparatus is also desirable in other industries. The rotor means in FIGS. 1–4 has been shown only by way of example and there are many variations which are well known to the art which are applicable to this invention. Any mixer means, including a single mixer means which cooperates with a housing to define volumes of a first ingredient is within the scope and contemplation of mixer means as used in this invention. Similarly, the tubing means 25 has been described in detail but it is understood that any means for streaming the second ingredient to wash the mixer means of the first ingredient and to disperse the defined volumes of the first ingredient into the streaming second ingredient is within the contemplation of this invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be restored to without departing from the spirit and the scope of the invention as hereinafter claimed.

What is claimed is:

1. An apparatus to disperse a first ingredient into a second ingredient, comprising in combination:
    a housing having an input and output aperture;
    first and second gear means;
    means for establishing said first and second gear means to be in mesh with one another in said housing;
    means for rotating said first and second gear means;
    means for introducing the first ingredient into said input aperture;
    means establishing cooperation between said housing and said first and second gear means to define volumes of the first ingredient;
    means for streaming the second ingredient in proximity to the commencement of mesh of said first and second gear means to wash the said first and second gear means of the first ingredient and to disperse said defined volumes of the first ingredient into the stream of the second ingredient;
    and said streaming means discharging the first and second ingredients from said output aperture.

2. An apparatus to disperse a first ingredient into a second ingredient, comprising in combination:
    a housing having an input and an output aperture;
    first and second gear means;
    means for mounting said first and second gear means in said housing to be in mesh with one another and to have a portion of the circumference of said gear means in close proximity with said housing;
    means for introducing the first ingredient into said input aperture;
    means for rotating said first and second gear means to enclose discrete volumes of the first ingredient between adjacent teeth of said gear means and said housing;
    said gear means conveying said volumes to said output aperture;
    and means for streaming the second ingredient in proximity to said output aperture to remove said discrete volumes of the first ingredient from said gear means and to disperse said discrete volumes in the stream of the second ingredient to be discharged from said output aperture as a substantially uniform dispersion.

3. An apparatus to disperse a first ingredient into a second ingredient, comprising in combination:
    a housing having an input and an output aperture;
    first and second gear means in mesh with one another,
    means for rotating said gear means;
    means for introducing the first ingredient into said input aperture;
    means establishing cooperation between said housing and said gear means to separate discrete volumes of the first ingredient at said input aperture;
    said gear means conveying said volumes to said output aperture;
    and means for streaming the second ingredient in proximity to said output aperture to remove said discrete volumes of the first ingredient from said gear means and to disperse said discrete volumes in the stream of the second ingredient to be discharged from said output aperture as a substantially uniform dispersion.

4. An apparatus as recited in claim 2, wherein said means for rotating said gear means includes hydraulic motor means.

5. An apparatus to disperse a first ingredient into a second ingredient, comprising in combination,
    a housing having a housing surface during a chamber;
    said housing having an input and an output aperture located on opposite sides of said chamber;
    first and second gear means;
    means for mounting said first and second gear means in said chamber to be in mesh with one another and to have a portion of the circumference of said gear means in close proximity with said housing surface;

means for introducing the first ingredient in said input aperture;

means for rotating said first and second gear means to enclose discrete volumes of the first ingredient between adjacent teeth of said gear means and said housing surface;

said rotating means moving said discrete volumes of the first ingredient along said housing surface to said output aperture;

and means for continuously streaming the second ingredient into said chamber in proximity to the mesh of said gear means at said output aperture to remove the discrete volumes of the first ingredient from the teeth of said gear means and to uniformly disperse said discrete volumes of the first ingredient in the continuous stream of the second ingredient to be discharged from said output aperture as a substantially uniform dispersion.

6. An apparatus to disperse a first ingredient into a second ingredient, comprising in combination:

a housing having a housing surface defining a chamber;

said housing having an input and an output aperture located on opposite sides of said chamber;

first and second gear means;

means for mounting said first and second gear means in said chamber to be in mesh with one another and to have a portion of the circumference of said gear means in close proximity with said housing surface;

means for introducing the first ingredient in said input aperture;

hydraulic motor means for rotating said first and second gear means to enclose discrete volumes of the first ingredient between adjacent teeth of said gear means and said housing surface;

said rotating means moving said discrete volumes of the first ingredient along said housing surface to said output aperture;

tubing means established through said housing to have a portion thereof in said chamber in proximity to the mesh of said gear means at said output aperture, and said tubing means having orifice means for streaming the second ingredient into said chamber and into the mesh of said gear means to remove the discrete volumes of the first ingredient from the teeth of said gear means and to uniformly disperse said discrete volumes of the first ingredient in the continuous stream of the second ingredient to be discharged from said output aperture as a substantially uniform dispersion.

7. An apparatus as recited in claim 6, wherein said orifice means is a slot having a length substantially equal to the thickness of said gear means.

8. An apparatus as recited in claim 6, wherein said tubing means is substantially parallel to the axis of rotation of said gear means.

9. A method of dispersing flavor elements into a food product by first and second gear means in mesh with one another, comprising the steps of:

dividing the flavor elements into discrete volumes by adjacent teeth of the gear means;

moving said discrete volumes along the housing by the gear means to contact the food product; and, streaming the food product at the commencement of mesh of the first and second gear means to wash the first and second gear means of the flavor elements and to disperse the flavor elements uniformly within the food product.

10. A method as recited in claim 9, wherein the step of streaming the food product includes continuously streaming at least seven volume units of the food product to remove one volume unit of the periodic discrete volumes of the flavor elements from the gear means.

11. A method of dispersing a first semi-solid ingredient into a second viscous liquid ingredient by first and second gear means in mesh with one another and located in a housing, comprising the steps of:

introducing the first ingredient into the housing;

separating the first ingredient into substantially discrete volumes between the teeth of the first and second gear means and the housing;

moving the first ingredient by the first and second gear means to periodically introduce discrete volumes of the first ingredient into contact with the second ingredient;

streaming the second ingredient in a continuous flow at the commencement of mesh of the first and second gear means to wash the teeth of the first and second gear means of the discrete volumes of the first ingredient and to disperse the first ingredient uniformly within the second ingredient;

and removing the dispersed first ingredient in the second ingredient from the housing.

12. A method as set forth in claim 11, wherein the first and second ingredients are food products.

* * * * *